United States Patent Office 3,291,734
Patented Dec. 13, 1966

3,291,734
BORON, PHOSPHORUS AND SULPHUR CONTAINING ADDITIVES AND METHODS OF MAKING SAME
Chien-wei Liao, Beachwood, Ohio, assignor to The Standard Oil Company, Cleveland, Ohio, a corporation of Ohio
No Drawing. Filed Apr. 16, 1962, Ser. No. 187,969
16 Claims. (Cl. 252—46.7)

This application is a continuation-in-part of application Serial No. 109,501, filed May 12, 1961 and now abandoned.

This invention relates to novel boron-phosphorus-sulphur containing compounds and analogous reaction products not definable as compound, and to their use as multi-functional petroleum stock additives. The invention also relates to methods of making these additives.

The compounds contemplated by this invention have the following general formula:

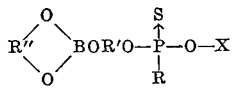

where

R is an alkenyl radical having from 8 to 30 carbon atoms,
R' is selected from the group consisting of alpha and beta alkylene radicals having from 2 to 10 carbon atoms,
R" is selected from the group consisting of alpha and beta alkylene radicals having from 4 to 10 carbon atoms, and
X is selected from the group consisting of alkyl radicals having from 2 to 18 carbon atoms, and

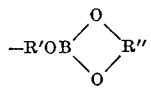

where

R' and R" are defined the same as above.

It is to be understood that R' and R" may be the same or different.

These compounds can be prepared by reacting an alpha olefin (i.e., an olefin having a terminal double bond) with phosphorus pentasulfide to form a first intermediate; reacting this first intermediate with glycols or a mixture of glycols and alcohols to form a second intermediate; and finally, reacting this second intermediate with glycol borates or precursors thereof (such as a mixture of boric acid and glycol) to form the desired compound.

As noted above, this invention also contemplates analogous boron-phosphorous-sulphur containing reaction products not definable as compounds. These reaction products are prepared in substantially the same manner as described above except that the olefin starting material is either a beta olefin (or any other olefin having an internal double bond) or a mixture of olefins, some of which have internal double bonds. Suitable sources of mixed olefins include commercially available mixed polybutenes, mixed polypropylenes and highly unsaturated petroleum fractions such as catalytic cracker distillate, motor polymer and the like.

The molecular weights of these materials will range from about 100 to about 800. By way of example, only, polybutenes are commercially available in molecular weights (avg.) of 336, 520, 670 and 730.

The analogous reaction products prepared from these olefin starting materials are apparently complex mixtures of compounds and while infrared analyses have confirmed the fact that a reaction takes place, as evidenced by an absence of starting reagents in the reaction product, it has not been possible to isolate or adequately identify specific compounds in the reaction product. Nonetheless, they are useful in the same manner as the identifiable compounds.

The utility of boron, phosphorus and sulphur as petroleum stock additives is well recognized. The addition of boron compounds to fuels and/or lubricants for use in an internal combustion engine is known to effect more efficient and cleaner engine operation. Phosphorus fuel additives suppress deposit induced auto-ignition and reduce the incidence of spark plug fouling. Phosphorus as a lubricating oil additive tends to reduce corrosion, sludge and lacquer formation. Sulphur has long been recognized as an antioxidant and metal deactivator. Heretofore, the provision of effective quantities of all three elements has been feasible only through the use of more than one additive.

In accordance with the present invention, it is possible to supply a petroleum stock with effective quantities of boron, phosphorus and sulphur by a single blending step, using a single novel compound or reaction product of the class or type described above.

The compounds and analogous reaction products of this invention may be added to any petroleum stock known to be benefited by the presence of boron, phosphorus and/or sulphur such as gasoline, oils boiling in the range of jet fuels, diesel oils and home heating oils, and lubricating oils; they have been found to be particularly suited for use as modifiers for hydrocarbon stocks of the gasoline boiling range. As gasoline additives, these compounds and reaction products inhibit surface ignition and reduce spark plug fouling to provide a smoother, more efficiently operating engine. Surprisingly, this improvement is realized without the severe octane rating loss usually associated with phosphorus and sulphur containing additives.

It is therefore an object of this invention to prepare novel boron-phosphorus-sulphur containing compounds and analogous reaction products.

It is a further object of this invention to provide novel syntheses for the boron-phosphorus-sulphur containing additives of this invention.

It is a further object of this invention to provide improved petroleum stocks containing a boron-phosphorus-sulphur containing reaction product or one or more of the novel boron-phosphorus-sulphur compounds described above.

Other objects and advantages will become apparent from the following detailed description of this invention.

The novel boron-phosphorus-sulphur additives of this invention may be prepared by a variety of alternative methods, all based upon the following four-step procedure;

(I) React $P_2S_5$ with an olefin to provide a $P_2S_4$-olefin reaction product, or intermediate I.

(II) React intermediate I with a glycol or an alcohol glycol mixture to form intermediate II.

(III) React boric acid with a glycol to form a glycol borate. This may be done separately or in situ in Step IV.

(IV) React intermediate II with the glycol borate (or a precursor thereof) of Step III to form the boron-phosphorus-sulphur reaction product.

Graphically, the vairous reactions proceed as follows:

(I)

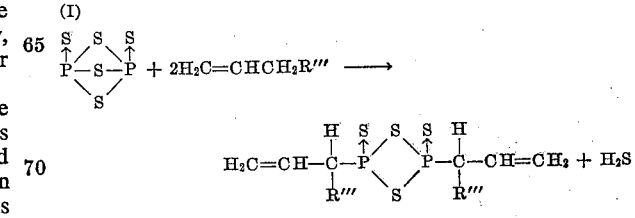

where R''' is an alkyl radical having from 5 to 27 carbon atoms.

This reaction analogizes the attack of $P_2S_5$ on the allylic hydrogen of cyclohexene as shown by the work of Fay and Lankelma, J. Am. Chem. Soc., vol. 74, page 4933 (1952). While an olefin with a terminal double bond is shown, it will be recognized that an olefin with an internal double bond may also react in the manner indicated. For purposes of simplicity in illustrating the following steps, the olefin portion of the reaction product

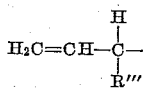

will be replaced by R, where R is defined the same as above in connection with the first presented general formula.

(II)

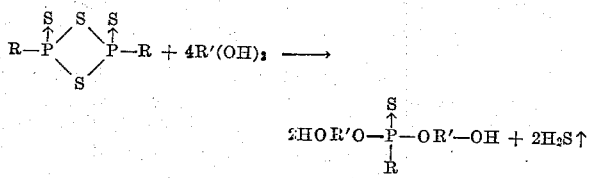

where R and R' are defined the same as above.

(III)

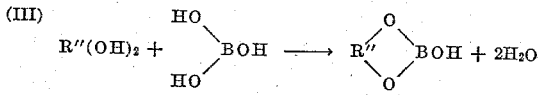

where R'' is defined the same as above. Boric oxide may be substituted for boric acid in this reaction.

(IV)

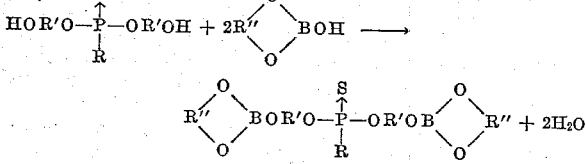

where R, R', and R'' are defined the same as above.

As an alternative procedure, the Step II reaction may be carried out using a mixture of glycols and alcohols in any desired ratio. For purposes of illustration here, a 2:2 ratio has been selected:

(IIa)

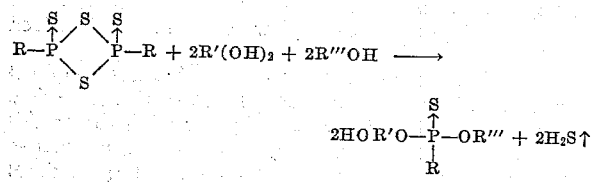

where R and R' are defined the same as above and R''' is an alkyl radical having from 2 to 18 carbon atoms. R and R''' may have the same or a different number of carbon atoms.

It follows that the intermediate II(a) reacts with a glycol borate, paralleling Step IV above, to produce the following results:

IV(a)

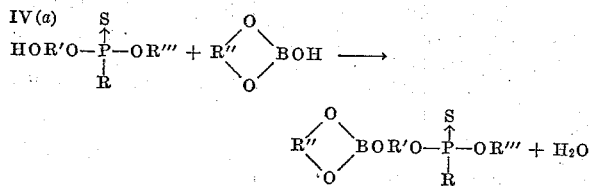

where R''' is an alkyl radical having from 2 to 18 carbon atoms, and R, R' and R'' are defined the same as above. It will be recognized that this reaction product has a boron-phosphorus-sulphur ratio of 1:1:1 while the reaction product of Step IV above had a ratio of 2:1:1.

Instead of preparing a 1:1 molar glycol borate in Step III above, other equi-molar ratios of glycol to boric acid may be used. Illustrative is the following set of reactions where a 2:2 glycol borate is employed:

III(b)

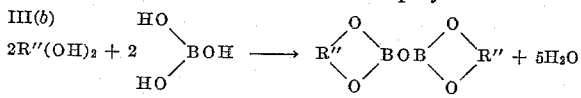

IV(b)

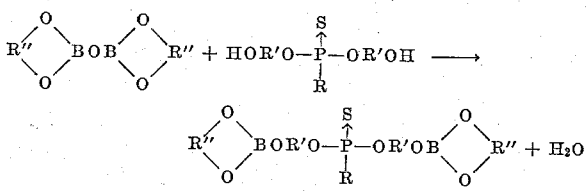

where R, R' and R'' are defined the same as above.

It is also possible to eliminate Step III by forming the glycol borate in situ in Step IV. This can be accomplished by adding appropriate stoichiometric quantities of glycol and boric acid to the intermediates II or II(a).

By still another alternative procedure a 2:1 molar glycol borate may be prepared and reacted directly with the Step I intermediate, thereby combining Steps II and IV:

III(c)

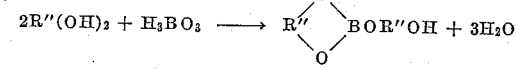

II and IV(c)

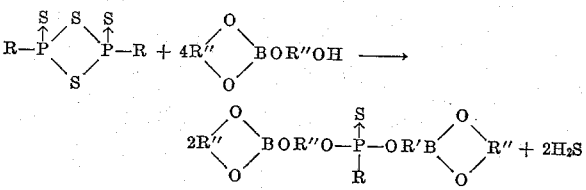

where R and R'' are defined the same as above. Combined Steps II and IV may also be carried out by reacting the $P_2S_4$-olefin intermediate with a 3:2 (molar) glycol borate plus a molecule of glycol, or with appropriate quantities of glycol and boric acid.

It will be understood that glycol borates other than the 1:1 molar may also be used in carrying out this reaction illustrated at IV(a). Further, the glycols used need not be pure materials. Mixtures of glycols are also contemplated.

While olefins with internal double bonds may react with phosphorus pentasulfide in the manner shown in Equation I above, such olefins are apparently capable of forming more than one reaction product. This belief is based upon the observation that when one mole of $P_2S_5$ is reacted with an olefin having an internal double bond or with a mixture of olefins some of which have internal double bonds, the evolution of hydrogen sulfide is not limited to one mole, but may vary between approximately one-half mole and two moles. It is theorized that since olefins with internal double bonds have two separate sites of allylic hydrogens, a single molecule of $P_2S_5$ may be, in at least some cases, attacking both sites on two olefin molecules, liberating two molecules of $H_2S$:

I(a)

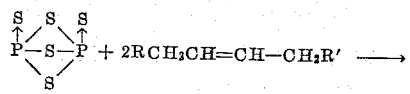

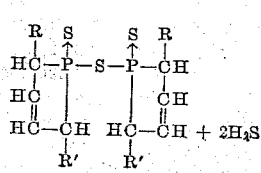

where R and R' are selected from the group consisting of alkyl radicals having from 2–13 carbon atoms and hydrogen. R and R' may be the same or different.

Since under preferred reaction conditions, somewhere between one and two moles of $H_2S$ are liberated, it is further theorized that the reaction product is a mixture of at least the compounds of the type produced in Equations I and I($a$) above.

It is also possible that the reaction product may contain still other compounds such as those formed by the attack of separate $P_2S_5$ molecules on the two allylic hydrogen sites of each of two olefin molecules:

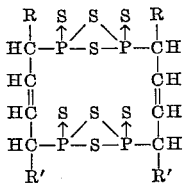

where R and R' are defined the same as in Equation I($a$). Whatever may be the exact nature of the reaction product, it can be readily prepared in the following manner.

*Step I.*—React one molar moiety of $P_2S_5$ with 2 molar moieties of beta-olefins or a mixture of alpha or beta olefins to form a first intermediate This is accomplished by simply heating the admixed reagents at a temperature within the range of 150° C. to 250° C. Evolved $H_2S$ should be trapped and quantitatively analyzed.

Heating may be discontinued as soon as the reaction mixture becomes "pentane soluble" indicating an absence of free $P_2S_5$. The pentane solubility tests consist of adding 20 parts of a reaction mixture and 80 parts of n-pentane to a test tube, which is then tightly stoppered and thoroughly shaken. The miscibility of the materials in the test tube is then observed with the term "pentane soluble" being applied only to those materials which present completely homogeneous solutions.

In some cases pentane solubility may be achieved before one mole of $H_2S$/mole of $P_2S_5$ have evolved. In either event, when the effect is achieved, a determination should be made of the number of moles of $H_2S$ evolved to this point.

*Step II.*—React the first intermediate with glycols or a mixture of glycols and alcohols to form a second intermediate This is accomplished by simply heating (with stirring) the admixed reagents at a temperature within the range of 150° C. to 250° C. Here too evolved $H_2S$ should be trapped and quantitatively analyzed.

The number of moles of glycol or glycol and alcohol, required for a complete reaction can be determined from the following empirical formula:

$$\text{No. moles/mole of } P_2S_5 = 4 - 2[n-(1+x)]$$

where $n$=No. moles of $H_2S$/mole of $P_2S_5$ evolved in the Step I reaction
$x=0$ when $n \geq 1$
$x=(n-1)$ when $n<1$ By way of example only, assuming 1.5 moles of $H_2S$/mole of $P_2S_5$ were evolved in the Step I reaction, then the number of moles of glycol (or glycol and alcohol) required in Step II are:

$$4-2[1.5-(1+0)]=3$$

Similarly, assuming 0.5 mole of $H_2S$/mole of $P_2S_5$ was evolved in the Step I reaction, then the number of moles of glycol (or glycol and alcohol) required in Step II are:

$$4-2[0.5-1+(0.5-1)]=4$$

The completion of the Step II reaction is indicated by the evolution of $3-n$ moles of $H_2S$/mole of $P_2S_5$ where $n$ is defined the same as above.

*Step III.*—React second intermediate with glycol borate or precursor thereof to form final boron-phosphorus-sulphur containing reaction product This is accomplished by mixing the reagents in a nonpolar hydrocarbon solvent (such as benzene, toluene or a xylene) heating under reflux, and removing water of reaction by azeotropic distillation. The last traces of solvent can be removed by vacuum stripping or clay contacting.

The number of moles of 1:1 (molar) glycol borate per mole of $P_2S_5$ required for a complete reaction is the same as the number of moles of glycol per mole of $P_2S_5$ used in Step II. This holds true irrespective of whether glycols alone or a mixture of glycols and alcohols were used in Step II. A 2:2 (molar) glycol borate may also be used, in half the amount indicated for the 1:1 compound.

Instead of using a glycol borate as the reagent, the second intermediate may be reacted with a mixture of boric acid and glycol in sufficient equimolar amounts to provide enough 1:1 (molar) glycol borate to complete the reaction.

As an alternative procedure, Steps II and III may be combined by reacting the Step I intermediate with appropriate amounts of glycol and boric acid and thus directly forming the desired boron, phosphorus and sulphur containing reaction mixture. The glycol and boric acid requirements can be determined in the same manner described above for separately conducting Steps II and III, i.e., by using the disclosed empirical formula. Once having the number of moles of glycol and glycol borate required for Steps II and III respectively, it is only necessary to determine how much glycol and boric acid is needed to form the calculated amount of glycol borate, and add to these figures the amount of glycol needed for the Step II reaction, to arrive at the total amounts of glycol and boric acid required for the combined reaction.

It will be understood, of course, that boron, phosphorus and sulphur containing compounds produced from α-olefinic starting materials may also be prepared by the procedures just described. However, since each of the steps in the reaction of α-olefins with $P_2S_5$, glycol and glycol borate proceeds stoichiometrically, it is unnecessary to resort to these empirical syntheses.

Those skilled in the art will recognize that compounds of widely varying molecular weights and solubility characteristics may be tailor-made according to the teachings of this invention.

Example I

*Step I.*—111 grams of $P_2S_5$ were added to 336 grams of mixed polybutenes (avg. mol. wt. 336; sp. gr. of 0.831 at 60/60° F.) in a reaction vessel. The reactants were heated to and maintained at a temperature which varied between 190° C. and 220° C., under constant stirring and nitrogen flushing. Evolved hydrogen sulfide was collected in scrubbers containing 20% NaOH solution. The amount of hydrogen sulfide evolved was determined periodically by direct weighing of the scrubbers. The pentane solubility of the reaction product was also determined periodically, using the procedure heretofore described.

After 6.8 hours of reacting with the evolution of 1.53 moles of $H_2S$/mole of $P_2S_5$, the reaction product was found to be pentane soluble. The product weighed 418.4 grams; a 97.1% yield.

*Step II.*—394 grams (equivalent to 0.46 mole of $P_2S_5$) of product of Step I were admixed with 1,3-butylene glycol in the amount required by the equation: moles of glycol/mole of $P_2S_5=4-2[n-(1+x)]$.

Where $n$ and $x$ are defined the same as above.

This works out to be 2.9 moles of glycol/mole of $P_2S_5$. Since the glycol is to be reacted with the equivalent of only 0.46 mole of $P_2S_5$, only 1.4 moles, or 122 grams of glycol are required.

The reactants were heated to and maintained at a temperature which varied between 176° C. and 186° C., under constant stirring and nitrogen flushing. Evolved hydrogen sulfide was collected in scrubbers containing 20% NaOH solution. The amount of hydrogen sulfide evolved was determined periodically by direct weighing of the scrubbers.

After 14.4 hours of reacting, with the evolution of 1.47 moles of $H_2S$/mole of $P_2S_5$ (3—$n$ moles of $H_2S$/mole of $P_2S_5$) heating was terminated. The product weighed 467.8 gms., a 95% yield.

*Step III.*—To 395.5 gms. of the product of Step II (equivalent to 0.38 mole of $P_2S_5$) were added 0.55 mole (116 gms.) of 2:2 (molar) 1,3 butylene glycol borate and 250 ml. of mixed xylenes as an azeotroping agent.

The amount of 2:2 (molar) glycol borate was determined as follows: According to the general procedure described hereinabove, the amount of 2:2 molar glycol borate/mole of $P_2S_5$ required for Step III equals half the amount of glycol required for Step II; in this case, half of 2.9 moles of 1.45 moles of 2:2 (molar) glycol borate/mole of $P_2S_5$. Since in the working example, the equivalent of only 0.38 mole of $P_2S_5$ are present, only 0.38 x 1.45 or 0.55 mole of 2:2 (molar) glycol borate are required.

The reactants were heated to reflux and maintained at a reflux temperature while water of reaction was azeotropically removed overhead and collected in a trap. Heating was discontinued when the evolution of water ceased. The last traces of solvent were removed by vacuum stripping.

Example II

*Step I.*—74.5 lbs. of $P_2S_5$ were added to 225 lbs. of mixed polybutenes (avg. mol. wt. 336; sp. gr. of 0.831 at 60/60° F.) in a reaction vessel. The reactants were heated to and maintained at a temperature which varied between 206° C. and 214° C., under constant stirring and nitrogen flushing. Evolved hydrogen sulfide was collected in scrubbers containing 20% NaOH solution. The amount of hydrogen sulfide evolved was determined periodically by direct weighing of the scrubbers. The pentane solubility of the reaction product was also determined periodically, using the procedure heretofore described.

After 20 hours of reacting with the evolution of 1.5 moles of $H_2S$/mole of $P_2S_5$ the reaction product was found to be pentane soluble.

*Step II.*—251.5 lbs. (equivalent to 0.35 mole of $P_2S_5$) of product of Step I was admixed with 1,3 butylene glycol in the amount required by the equation; moles of glycol/mole of $P_2S_5=4-2[n-(1+x)]$.

Where $n$ and $x$ are defined the same as above.

This works out to be 3 moles of glycol/mole of $P_2S_5$. Since the glycol is to be reacted with the equivalent of only 0.35 mole of $P_2S_5$, only 1.04 moles or 90.4 lbs. of glycol are required.

The reactants were heated to and maintained at a temperature which varied between 176° C. and 182° C., under constant stirring and nitrogen flushing. Evolved hydrogen sulfide was collected in scrubbers containing 20% NaOH solution. The amount of hydrogen sulfide evolved was determined periodically by direct weighing of the scrubbers.

After 16.5 hours of reacting, with the evolution of 1.5 moles of $H_2S$/mole of $P_2S_5$ (3—$n$ moles of $H_2S$/mole of $P_2S_5$) heating was terminated.

*Step III.*—To 294.8 lbs. of the product of Step II (equivalent to 0.23 mole of $P_2S_5$) were aded 62 lbs. of 1,3 butylene glycol (0.7 mole), 42.7 lbs. of boric acid (0.7 mole) and 160 lbs. of mixed xylenes as an azeotroping solvent.

The glycol and boric acid requirements were determined as follows: The number of moles of 1:1 (molar) glycol borate per mole of $P_2S_5$ required for this Step III reaction is the same as the number of moles of glycol per mole of $P_2S_5$ required for the Step II reaction, viz., 3 moles per mole of $P_2S_5$. However, since the equivalent of only 0.23 mole of $P_2S_5$ are present, only 0.7 mole of glycol borate are required. Finally, since glycol and boric acid react in a 1:1 molar ratio to form 1 mole of glycol borate, it will be apparent that the reaction requires 0.7 mole of each of the glycol and boric acid.

The reactants were heated to reflux and maintained at a reflux temperature while water of reaction was azeotropically removed overhead and collected in a trap. Heating was discontinued when the evolution of water ceased. The last traces of solvent were removed by vacuum stripping.

Example III

*Step I.*—111 grams of $P_2S_5$ were added to 336 grams of mixed polybutenes (ave. mol. wt. 336; sp. gr. 0.831 at 60/60° F.) in a reaction vessel. The reactants were heated to and maintained at about 225° C. under constant stirring and nitrogen flushing. Evolved hydrogen sulfide was collected in scrubbers containing 20% NaOH solution. The amount of hydrogen sulfide evolved was determined periodically by direct weighing of the scrubbers. The pentane solubility of the reaction product was also determined periodically using the procedure heretofore described.

After 7.9 hours of reaction with the evolution of 1.49 moles of $H_2S$/mole of $P_2S_5$, the reaction product was found to be pentane soluble.

*Steps II and III combined.*—212.9 grams (equivalent to 0.25 mole of $P_2S_5$) of the product of Step I were admixed with 137.0 grams (1.52 moles) of 1,3 butylene glycol and 47.0 grams (0.76 mole) of boric acid. These requisite amounts of glycol and boric acid were determined in the same manner described heretofore where Steps II and III were conducted separately.

The reactants were heated to reflux and maintained at a reflux temperature while both $H_2S$ and water of reaction were removed. It was found that the water and $H_2S$ evolved at substantially the same rate, and that $H_2S$ continued to come off after water evolution ceased. Heating was discontinued with the evolution of 3—$n$ moles of $H_2S$, where $n$ is defined the same as above. The temperature at this point had reached about 205° C.

It should be noted that where Steps II and III are combined, the use of an azeotroping solvent is not required.

Example IV

*Step I.*—666 grams of $P_2S_5$ were added to 1346 grams of hexadecene-1 in 1000 ml. of mixed xylenes. The mixture was heated at 135° C. under bubbling nitrogen. Evolved $H_2S$ was trapped in a concentrated sodium hydroxide solution until the theoretical amount had been removed, indicating a completed reaction. The solvent was removed by vacuum stripping.

*Step II.*—64.8 grams of the Step I $P_2S_4$-olefin reaction product and 36.7 grams of butanediol 1,3 were heated together at 160° C. with stirring, under a nitrogen blanket. Evolved $H_2S$ was trapped in a concentrated sodium hydroxide solution until the theoretical amount had been removed, indicating a completed reaction. The resultant product was cooled to room temperature.

*Step III.*—Preparation of di(butylene diol 1,3) diborate by known procedure.

*Step IV.*—27.7 ml. of di(butylene diol 1,3) diborate and 25 ml. of benzene were admixed with 46.4 grams of the Step II $P_2S_4$ olefin-glycol reaction product. The mixture was heated to reflux and water of reaction was removed by azeotropic distillation. The last traces of benzene were removed by vacuum stripping.

Example V

Step I.—Same as Example IV, Step I.

Step II.—63.7 grams of the reaction product of Example IV, Step I and 58.4 grams of 2-ethyl hexanediol 1,3 were heated together at 170° C., with stirring under a nitrogen blanket. Evolved H₂S was trapped in a concentrated sodium hydroxide solution until the theoretical amount had been removed, indicating a completed reaction. The resultant product was cooled to room temperature.

Step III.—Preparation of di(2-ethyl hexane diol 1,3) diborate by known procedure.

Step IV.—28.5 ml. of di(2-ethyl hexane diol 1,3) diborate and 28 ml. of benzene were admixed with 37.4 grams of the Step II P₂S₄-olefin glycol reaction product. The mixture was heated to reflux and water of reaction was removed by azeotropic distillation. The last traces of benzene were removed by vacuum stripping.

Example VI

Step I.—Same as Example IV, Step I.

Step II.—60.5 grams of the reaction product of Example IV, Step I and 23.6 grams of ethylene glycol were heated together at 170° C., with stirring under a nitrogen blanket. Evolved H₂S was trapped in a concentrated sodium hydroxide solution until the theoretical amount had been removed, indicating a completed reaction. The resultant product was cooled to room temperature.

Step III.—Preparation of di(2-ethyl hexane diol 1,3) diborate by known procedure.

Step IV.—66.9 ml. of di(2-ethyl hexane diol 1,3) diborate and 60 ml. of benzene were admixed with 62.3 grams of the Step II P₂S₄-olefin-glycol reaction product. The mixture was heated to reflux and water of reaction was removed by azeotropic distillation. The last traces of benzene were removed by vacuum stripping.

Other olefins which may be reacted with P₂S₅ include polyisobutenes, decenes, tridecenes, octadecenes, and the like.

Alcohols which may be used in conjunction with glycols in Step II include 2-ethyl hexanol, tridecanols, lauryl alcohol, oleyl alcohol, stearyl alcohol and the like.

Reference may be had to U.S. Patent 2,741,548 to Darling et al. for additional examples of glycol borates which may be used according to the practice of this invention. The Darling et al. patent discloses glycol borate compounds having the general formula

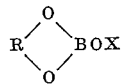

Where X is hydrogen, the compounds are referred to as 1:1 (molar) glycol borates. Where X is

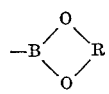

the compounds are referred to as 2:2 (molar) glycol borates. Where X is

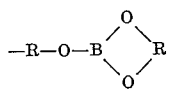

the compounds are referred to as 3:2 (molar) glycol borates. Any of the glycol borates so disclosed which satisfy the carbon chain length requirements of this invention may be used.

When used as a leaded gasoline additive, the concentration of boron-phosphorus-sulphur compound or analogous reaction product present may vary considerably, and is conveniently expressed in terms of theories of phosphorus. For purposes of this disclosure, a theory of phosphorus will be understood to designate that amount of phosphorus required to convert the lead of the tetra-alkyl lead anti-knock agent to lead ortho-phosphate. It will be understood that the additive concentration may also be expressed in terms of the theories of sulphur or boron. By analogy, a theory of sulphur or boron would designate the amount of the element required to convert the lead to lead sulfate or lead orthoborate respectively.

Stoichiometrically, 1.0 theories equals 2 atoms of phosphorus for each 3 moles of tetra-alkyl lead compound. It has been found that concentration as low as 0.05 theories have produced beneficial results, with a preferred range being 0.2 to 1.0 theories. Actually, there is no upper limit except perhaps one imposed by economic considerations, and in this sense, concentrations equivalent to more than 1.0 theories usually cannot be justified.

Gasoline base stocks to which the boron-phosphorus-sulphur compounds are added may be any of those conventionally used in preparing a motor fuel for a spark-ignited internal combustion engine such as catalytic distillate, motor polymer, alkylate, catalytic reformate, isomerate, naphthas, etc. The gasoline will preferably contain an anti-knock agent of the tetra-alkyl lead type such as tetraethyl lead, tetramethyl lead or chemical or physical mixtures thereof, and a scavenger agent such as ethylene dichloride and/or ethylene dibromide. The amount of anti-knock agent will usually be at a level of approximately 3 ml./gal., but may range from ½ ml./gal. up to 6 ml./gal. The base gasoline may also include other common additives such as solvent oils, dyes and the like.

The effectiveness of the additives of this invention was demonstrated by the following test:

A 1960 350 H.P. ram induction Chrysler Imperial engine was cyclicly operated under the following conditions:

|  | R.p.m. | Load (lb.) | Time |
| --- | --- | --- | --- |
| Phase A | 500 | 0 | 21 sec. |
|  | 1,800 | 40 | 14 sec. |
|  | 1,200 | 20 | 35 sec. |
| Phase B | 2,200 | 60 | 1 hr. |

Phase A operation was conducted for a period of 7 hours, which was followed by one hour of Phase B operation. This constituted one over-all cycle of 8 hours duration. These cycles were repeated more or less continuously (except for weekends, stops for oil additions, etc.) until 400 hours of operation had been logged. This approximated 10,000 miles of driving at an average speed of 25 miles per hour.

Crankcase oil was replenished once every 24 hours in an amount corresponding to a consumption rate of 1 quart in 2,000 miles. Since the engine did not actually consume oil at this rate, it was necessary to draw off some oil so that the replenishments could be accommodated without overfilling the crankcase. The withdrawn samples of oil were inspected for iron content and dispersancy as will be described hereinafter.

The base fuel used had the following composition and inspections:

| | |
| --- | --- |
| Saturates _____ vol. percent__ | 66 |
| Olefins _____ | 8 |
| Aromatics _____ | 26 |
| R.V.P. _____ p.s.i__ | 9.31 |
| A.P.I. _____ | 59.52 |
| Specific Gravity _____ | 0.7408 |
| T.E.L. _____ ml./gal__ | 2.2 |

Engler distillation (° F.)

| | |
|---|---|
| I.B.P. | 94 |
| 5 | 126 |
| 10 | 140 |
| 30 | 201 |
| 50 | 238 |
| 70 | 280 |
| 90 | 337 |
| 95 | 368 |
| E.P. | 377 |

This test compared a fuel containing an additive produced according to the steps described in Example I, hereinafter termed "BPS additive," with a "blank" fuel which contained separate boron and phosphorus compounds which are presently in widespread commercial use. Since a "blank" fuel containing no additives would be predictably worse than a fuel with additives, one was not included in the test.

The two fuels tested had the following concentrations of elemental boron, phosphorus and sulphur.

| | Conventional Additives | BPS Additive |
|---|---|---|
| Boron (p.p.m.) | 40 | 12 |
| Phosphorus (theories) | 0.2 | 0.15 |
| Sulphur (theories) | | 0.10 |

Upon completion of the 400 hour test, the test engine was disassembled and inspected for the following:

varnish ring weight loss
sludge spark plug wear
ring gap increase compression

In addition, the crankcase oil was inspected for iron content and dispersancy.

There follows a discussion of each of these inspection procedures and the results obtained.

*Visual engine ratings*

The procedure followed was the standard CRC test procedure, L-4 rating for varnish and sludge. Both materials are rated on a 0-50 scale where 50 is a perfect rating. The results were as follows:

| | Conventional Additives | BPS Additive |
|---|---|---|
| Varnish | 46.25 | 46.00 |
| Sludge | 36.50 | 46.50 |
| | 82.75 | 92.50 |

It will be seen that the additive of the present invention retains the excellent varnish rating of the conventional package while markedly improving the sludge rating.

*Engine wear*

Inspections were made of the ring gap increase and ring weight loss, of the top compression ring of each of the eight pistons. The values given below are the averages for the eight rings.

| | Conventional Additives | BPS Additive |
|---|---|---|
| Ring gap increase (in.) | 0.036 | 0.019 |
| Ring weight loss (gms.) | 0.63 | 0.40 |

The additive of this invention showed a significant improvement in both these wear factors.

These data were confirmed by compression pressure readings taken before and after the 400 hour test. As would be expected, the lower level of wear associated with the additive of the present invention resulted in a smaller decrease in compression pressure. The values reported below represent the average pressure loss for eight combustion chambers.

| | Conventional Additives | BPS Additive |
|---|---|---|
| Pressure loss (p.s.i.) | 22 | 6.5 |

*Spark plug wear*

At the end of the 400 hour test, the spark plugs were removed from the Chrysler test engine and installed in a 1954 Lincoln test engine. The Lincoln engine was run at 3100 r.p.m. until equilibrium was reached, whereupon the engine was then loaded to wide open throttle. During the period of loading, the number of spark plug misfires were recorded electronically. A plug which misfired 10 or more times during the loading period, failed the test.

The results were as follows:

| | Conventional Additives | BPS Additive |
|---|---|---|
| No. plugs failing | 8 | 1 |

*Iron in oil*

As previously noted, samples of oil removed after every 24 hours of engine operation were quantitatively analyzed for iron. The analysis was accomplished by X-ray diffraction. A plot was then made of p.p.m. iron against hours of operation, and a curve was generated from plot. The values recorded below correspond to the slope of the curve and represent the p.p.m. of iron released to the oil per hour of engine operation.

| | Conventional Additives | BPS Additive |
|---|---|---|
| Fe in oil (p.p.m./hr.) | 0.56 | 0.39 |

*Oil dispersancy*

Oil dispersancy was also measured after every 24 hours of engine operation. The following test procedure was employed:

A 10 gram sample of oil was placed in a 250 ml. Griffin beaker. A sheet of #1 Whatman filter paper was then placed in the beaker in such a fashion that the paper did not touch the side of the beaker. This set-up was permitted to stand for a period of 24 hours, during which time oil and sludge were absorbed by the filter paper. At the end of the time indicated two distinct lines were discernible on the paper; an upper oil line and a lower sludge line. The heights of these lines were measured and a ratio of the height of the oil line over the height of the sludge line was calculated and then plotted against time. A curve generated by such a plot starts at time zero with a gradually increasing slope until a fairly well defined "breaking point" is reached whereupon the slope of the curve rises quite rapidly. A rapidly rising slope indicates that the ratio of oil line to sludge line is approaching unity, which in turn indicated that the amount of sludge dispersed in the oil is approaching zero. The values reported below indicate the number of hours of engine operation it took to reach the afore-described "breaking point."

| | Conventional Additives | BPS Additive |
|---|---|---|
| Test hours to "breaking point" | 192 | >400 |

In addition of finding utility as gasoline modifiers, the novel boron-phosphorus-sulphur additives of this invention may also be used as additives for jet fuels, diesel oils, home heating oils, lubricating oils, and the like.

It is to be understood that various modifications of the foregoing invention will occur to those skilled in the art upon reading the above description. All such modifications are intended to be included as may be reasonably covered by the appended claims.

I claim:
1. A chemical process comprising the following steps:
   (a) reacting in a 1:2 molar ratio, $P_2S_5$ and an olefin, said reaction resulting in the evolution of $n$ moles of $H_2S$ per mole of $P_2S_5$, where $n$ has a value of from about 0.5 to about 2, and terminating the reaction after the reaction product becomes soluble in n-pentane;
   (b) reacting the reaction product of step (a) with a material selected from the group consisting of glycols and mixtures of glycols and saturated aliphatic hydrocarbyl alcohols, in an amount per mole of $P_2S_5$, determined by the formula

$$4-2[n-(1+x)]$$

where $n$ is defined the same as above and where $x$ has a value selected from the group consisting of 0 when $n \geq 1$, and $(n-1)$ when $n < 1$, and terminating the reaction with the evolution of $3-n$ moles of $H_2S$ per mole of $P_2S_5$ where $n$ is defined the same as above;
   (c) reacting the reaction product of step (b) with a material selected from the group consisting of glycol borates and precursors thereof to provide a number of moles of 1:1 glycol borate which equals the number of moles of glycol used in step (b).

2. The process of claim 1 in which the olefin described in step (a) has an average molecular weight within the range of about 100 to about 800 and is selected from the group consisting of olefins having internal double bonds and mixtures of olefins some of which have internal double bonds.

3. A chemical process comprising the following steps:
   (a) reacting at a temperature within the range of 150 to 250° C. in a 1:2 molar ratio, $P_2S_5$ and mixed polybutenes having an average molecular weight within the range of about 300 to about 800, said reaction resulting in the evolution of $n$ moles of $H_2S$ per mole of $P_2S_5$ where $n$ has a value of from about 0.5 to 2, and terminating the reaction after the reaction product becomes soluble in n-pentane;
   (b) reacting at a temperature within the range of 150–250° C. the reaction product of step (a) with a glycol in an amount per mole of $P_2S_5$, determined by the formula $$4-2[n-(1+x)]$$

where $n$ is defined the same as above and where $x$ has a value selected from the group consisting of 0 when $n \geq 1$, and $(n-1)$ when $n < 1$, and terminating the reaction with the evolution of $3-n$ moles of $H_2S$ per mole of $P_2S_5$ where $n$ is defined the same as above;
   (c) reacting in the presence of a nonpolar hydrocarbon azeotroping solvent, the reaction product of step (b) with a material selected from the group consisting of glycol borates and precursors thereof to provide a number of moles of 1:1 glycol borate which equals the number of moles of glycol used in step (b), and removing the water of reaction by azeotropic distillation.

4. A chemical process comprising the following steps:
   (a) reacting in a 1:2 molar ratio, $P_2S_5$ and an olefin, said reaction resulting in the evolution of $n$ moles of $H_2S$ per mole of $P_2S_5$, where $n$ has a value of from about 0.5 to about 2, and terminating the reaction after the reaction product becomes soluble in n-pentane;
   (b) reacting the reaction product of step (a) with a glycol and boric acid, said glycol being present per mole of $P_2S_5$ in twice the amount determined by the formula $$4-2[n-(1+x)]$$

where $n$ is defined the same as above and where $x$ has a value selected from the group consisting of 0 when $n \geq 1$ and $(n-1)$ when $n < 1$, said boric acid being present in an amount equal to half that of said glycol, and terminating the reaction with the evolution of $3-n$ moles of $H_2S$ per mole of $P_2S_5$ where $n$ is defined the same as above.

5. A chemical process comprising the following steps:
   (a) reacting at a temperature within the range of 150–250° C. in a 1:2 molar ratio, $P_2S_5$ and mixed polybutenes having an average molecular weight of 336, said reaction resulting in the evolution of $n$ moles of $H_2S$ per mole of $P_2S_5$, where $n$ has a value of from about 0.5 to about 2, and terminating the reaction after the reaction product becomes soluble in n-pentane;
   (b) reacting the reaction product of step (a) with 1,3 butylene glycol, said glycol being present per mole of $P_2S_5$ in twice the amount determined by the formula $$4-2[n-(1+x)]$$

where $n$ is defined the same as above and where $x$ has a value selected from the group consisting of 0 when $n \geq 1$ and $(n-1)$ when $n < 1$, and terminating the reaction with the evolution of $3-n$ moles of $H_2S$ per mole of $P_2S_5$ where $n$ is defined the same as above.

6. As a composition of matter, a petroleum stock selected from the group consisting of fuels and lubricants containing from 0.005 to 5 wt. percent of an additive produced by the process of claim 2.

7. The composition of claim 6 wherein the petroleum stock is an oil of the jet fuel boiling range and said additive is present in an amount within the range of 0.005 to 0.25 wt. percent.

8. A composition of claim 6 wherein the petroleum stock is an oil of the diesel fuel boiling range and said additive is present in an amount within the range of 0.005 to 0.25 wt. percent.

9. A composition of claim 6 wherein the petroleum stock is a lubricating oil and said additive is present in an amount within the range of 0.1 to 5 wt. percent.

10. A leaded hydrocarbon fuel of the gasoline boiling range which contains from ½ to 6 cc. tetraethyl lead per gallon and from 0.2 to 1.0 theories of phosphorus in the form of an additive produced by the process of claim 4.

11. A new compound having the formula:

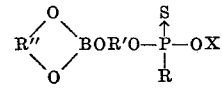

where:
R is an alkenyl radical having from 8 to 30 carbon atoms;
R' is selected from the group consisting of alpha and beta alkylene radicals having from 2 to 10 carbon atoms;
R'' is selected from the group consisting of alpha and beta alkylene radicals having from 4 to 10 carbon atoms; and
X is selected from the group consisting of alkyl radicals having from 2 to 18 carbon atoms and

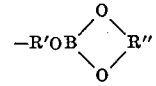

where R' and R'' are defined the same as above.

12. A leaded hydrocarbon fuel of the gasoline boiling range which contains from ½ to 6 cc. tetra alkyl lead per gallon and from 0.2 to 1.0 theories of phosphorus in the form of a compound having the formula

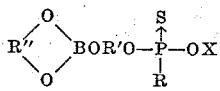

where:
R is an alkenyl radical having from 8 to 30 carbon atoms;
R' is selected from the group consisting of alpha and beta alkylene radicals having from 2 to 10 carbon atoms;
R'' is selected from the group consisting of alpha and beta alkylene radicals having from 4 to 10 carbon atoms; and
X is selected from the group consisting of alkyl radicals having from 2 to 18 carbon atoms and

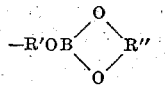

where R' and R'' are defined the same as above.

13. As a composition of matter, a petroleum stock containing from 0.005 to 5 weight percent of a compound having the formula:

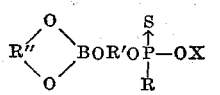

where:
R is an alkenyl radical having from 8 to 30 carbon atoms;
R' is selected from the group consisting of alpha and beta alkylene radicals having from 2 to 10 carbon atoms;
R'' is selected from the group consisting of alpha and beta alkylene radicals having from 4 to 10 carbon atoms; and
X is selected from the group consisting of alkyl radicals having from 2 to 18 carbon atoms and

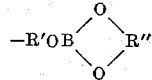

where R' and R'' are defined the same as above.

14. The composition of claim 13 wherein the petroleum stock is an oil of the jet fuel boiling range and said compound is present in an amount within the range of 0.005 to 0.25 weight percent.

15. The composition of claim 13 wherein the petroleum stock is an oil of the diesel fuel boiling range and said compound is present in an amount within the range of 0.005 to 0.25 weight percent.

16. The composition of claim 13 wherein the petroleum stock is a lubricating oil and said compound is present in an amount within the range of 0.1 to 5 weight percent.

References Cited by the Examiner

UNITED STATES PATENTS

| | | | |
|---|---|---|---|
| 2,794,821 | 6/1957 | Loughran | 260—461 |
| 2,897,071 | 7/1959 | Gilbert | 44—69 |
| 2,948,599 | 8/1960 | Orloff et al. | 44—69 |
| 3,014,952 | 12/1961 | Birum | 260—461 |

DANIEL E. WYMAN, *Primary Examiner.*
JOSEPH R. LIBERMAN, JULIUS GREENWALD,
*Examiners.*